United States Patent [19]

Matuska et al.

[11] Patent Number: 5,636,969
[45] Date of Patent: Jun. 10, 1997

[54] TORQUE TUBE/SPAR ASSEMBLY FOR VARIABLE DIAMETER HELICOPTER ROTORS

[75] Inventors: David G. Matuska, Huntington; Edward W. Gronenthal, Shelton; W. Donald Jepson, Huntington, all of Conn.

[73] Assignee: Sikorsky Aircraft Corporation, Stratford, Conn.

[21] Appl. No.: 412,175

[22] Filed: Mar. 28, 1995

[51] Int. Cl.$^6$ ..................................... B64C 11/28
[52] U.S. Cl. ....................... 416/87; 416/89; 416/226; 416/230
[58] Field of Search ..................... 416/87, 88, 89, 416/226, 229 R, 230

[56] References Cited

U.S. PATENT DOCUMENTS

| 2,163,481 | 6/1939 | Cameron . | |
|---|---|---|---|
| 2,163,482 | 6/1939 | Cameron . | |
| 3,128,829 | 4/1964 | Young . | |
| 3,606,571 | 9/1971 | Wood | 416/87 |
| 3,713,751 | 1/1973 | Fradenburgh et al. . | |
| 3,768,923 | 10/1973 | Fradenburgh . | |
| 3,884,594 | 5/1975 | Fradenburgh et al. . | |
| 4,007,997 | 2/1977 | Yarm . | |
| 4,074,952 | 2/1978 | Fradenburgh et al. . | |
| 4,111,606 | 9/1978 | Prewo | 416/230 |
| 4,142,697 | 3/1979 | Fradenburgh . | |
| 4,247,255 | 1/1981 | De Rosa | 416/226 |
| 4,621,980 | 11/1986 | Reavely et al. | 416/226 |
| 4,792,280 | 12/1988 | Olsen et al. . | |
| 5,242,267 | 9/1993 | Byrnes et al. . | |
| 5,253,979 | 10/1993 | Fradenburgh et al. . | |
| 5,299,912 | 4/1994 | Fradenburgh et al. . | |

Primary Examiner—Edward K. Look
Assistant Examiner—Chrisopher Verdier
Attorney, Agent, or Firm—Brian A. Collins

[57] ABSTRACT

A torque tube/spar assembly (100) for transferring operational loads of a Variable Diameter Rotor blade assembly (16) to a rotor hub assembly (18) and includes a torque tube member (24), a spar member (30) and a bearing assembly (40a, 40b) for telescopically mounting the spar member (30) to the torque tube member (24) and furthermore defines an internal channel (62) for housing a retraction/extension mechanism (64) which mounts to an internally formed restraint surface (86) of the spar member (30) and is operative to vary the length of the rotor blade assembly (18). The torque tube member (30) has a substantially constant external geometry along the length of bearing assembly engagement and defines a root end region (102), a tip end region (106) and an intermediate transition region (104) disposed therebetween. The spar member (30) has a substantially constant internal geometry and defines a root end region (110), a first transition (112), an intermediate region (114), a second transition region (116), a restraint region (118) and a tip end region (120). Each of the various regions of the torque tube and spar members (24, 30) have a characteristic stiffness value wherein the characteristic values ($104m$, $106m$) of the intermediate transition and tip end regions (104,106) of the torque tube member (24) are less than the characteristic stiffness value ($102m$) of the root end region (102) thereof, and wherein the characteristic stiffness value ($118m$) of the restraint region (118) of the spar member (30) is greater than said characteristic stiffness values ($114m$, $120m$) of the intermediate and tip end regions (114, 120) thereof, and wherein the characteristic stiffness value ($114m$) of the intermediate region (114) is less than the characteristic stiffness values ($110m$, $112m$, $116m$, $118m$) of the root end, first transition, second transition and restraint regions (110, 112, 116, 118).

25 Claims, 5 Drawing Sheets

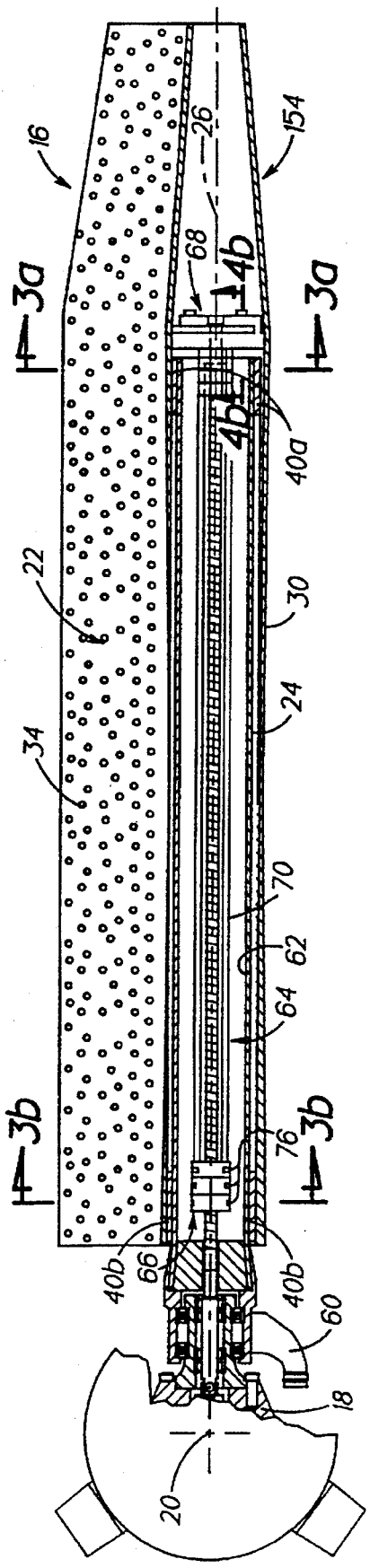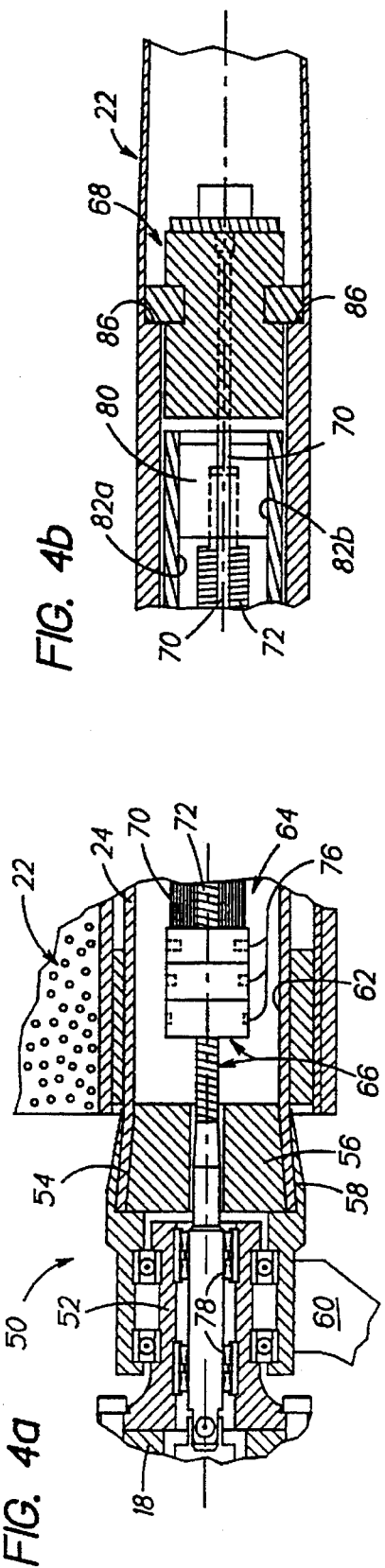
FIG. 2
FIG. 4b
FIG. 4a

TORQUE TUBE/SPAR ASSEMBLY FOR VARIABLE DIAMETER HELICOPTER ROTORS

TECHNICAL FIELD

This invention relates to Variable Diameter Rotor (VDR) systems for tilt rotor or tilt wing aircraft, and more particularly, to an improved torque tube/spar assembly for a variable diameter rotor (VDR) blade assembly.

BACKGROUND OF THE INVENTION

A tilt rotor or tilt wing aircraft typically employs a pair of rotor systems which are supported at the outermost end of a wing structure and are pivotable such that the rotors thereof may assume a vertical or horizontal orientation. In a horizontal orientation, the aircraft is capable of hovering flight, while in a vertical orientation, the aircraft is propelled in the same manner as conventional propeller-driven fixed-wing aircraft.

Currently, tilt rotor/tilt wing aircraft employ conventional fixed-diameter rotor systems which, in the aerodynamic and aeroelastic design thereof, attempt to blend the competing requirements of hovering and forward flight modes of operation. For example, with regard to hovering flight, it is generally advantageous to employ a large diameter rotor to improve hovering performance by lowering disk loading, reducing noise levels, and reducing downwash velocities. Conversely, a relatively small diameter rotor is desirable in forward flight to improve propulsive efficiency by minimizing blade aero-elastic properties, minimizing blade area, and reducing tip speed (Mach number).

Variable Diameter Rotor (VDR) systems are known to provide distinct advantages over conventional fixed-diameter rotors insofar as such systems are capable of successfully operating in both modes of operation. That is, when the plane of the rotor is oriented horizontally, the rotor diameter is enlarged for improved hovering efficiency and, when oriented vertically, the rotor diameter is reduced for improved propulsive efficiency.

An example of a VDR system and VDR blade assembly therefor is shown in Fradenburgh U.S. Pat. No. 3,768,923 wherein each blade assembly includes an outer blade segment which telescopes over a torque tube member so as to increase or decrease the rotor diameter. The outer blade segment includes a structural spar, i.e., the foremost structural element which carries the primary loads of the outer blade segment, a leading edge sheath assembly and trailing edge pocket assembly, which sheath and pocket assemblies envelop the spar section to define the requisite aerodynamic blade contour. The torque tube member mounts to a rotor hub assembly and receives the spar member of the outer blade segment. The torque tube member, furthermore, functions to transfer flapwise and edgewise bending loads to and from the rotor hub assembly while furthermore imparting pitch motion to the outer blade segment. The resultant torque tube/spar assembly forms a central channel for housing a retraction/extension mechanism. The retraction/extension mechanism includes a threaded jackscrew which may be driven in either direction by a bevel gear arrangement disposed internally of the rotor hub assembly. The jackscrew, furthermore, engages a plurality of stacked nuts which are rotationally fixed by the internal geometry of the torque tube member yet are permitted to translate axially along the jackscrew upon rotation thereof. Furthermore, centrifugal straps extend from each nut and are affixed via a retention plate to the tip end of the spar member. As the jackscrew turns, the stacked nuts are caused to translate inwardly or outwardly, thereby effecting axial translation of the outer blade segment. Systems relating to and/or further describing VDR systems are discussed in U.S. Pat. Nos. 3,884,594, 4,074,952, 4,007,997, 5,253,979, and 5,299,912.

While the operational requirements, i.e., the imposed loads, motions, vibratory environment etc., of conventional rotor systems and the design solutions to meet such requirements are well defined and documented, the requirements for a VDR system are still evolving. Hence, the design of such components as the rotor blade assembly, and particularly, the torque tube/spar assembly, present unique challenges which heretofore have not been addressed. For example, the telescoping feature of the VDR blade assembly necessitates that the torque tube member be relatively small, i.e., in chord and thickness dimension, to accept the enveloping outer blade segment. Accordingly, the torque tube member must be particularly robust or stiff to carry the combined flapwise, edgewise and torsional loads imposed by the outer blade segment.

Furthermore, the frequency response, and accordingly, the stiffness requirements of the blade assembly will vary depending upon the mass or weight distribution of the VDR blade assembly. For example, as weight penalties are incurred in the outer blade segment by, for instance, the addition of counterweights, non-optimum blade design or inefficient manufacturing methods, the in-plane or edgewise frequency of the blade assembly will decrease proportionally. Insofar as it is desirable for a VDR system to be "stiff-in-plane", e.g., have an edgewise frequency greater than about 1.3 cycles per revolution, to avoid resonant instabilities when retracting the outer blade segment, weight penalties incurred in the outer blade segment must be counteracted by increasing the structural stiffness, and, accordingly, the weight of the torque tube member. Weight penalties occurring farther outboard, e.g., at the tip end of the outer blade segment, exacerbate the stiffness/weight penalties incurred in the torque tube member.

Inefficient weight distribution of the VDR blade assembly can also have adverse effects on the overall weight and complexity of the retraction/extension mechanism. For example, one kilogram (2.2 lbs) of additional mass at the tip end of the outer blade segment produces nearly 6000N (1,350 lbs) of centrifugal force when the VDR blade assembly is in a fully-extended position. Insofar as centrifugal load is transferred to the rotor hub assembly by the retraction/extension mechanism, the strength and, consequently, weight thereof will increase substantially to react the additional centrifugal load.

Fradenburgh et al. U.S. Pat. No. 3,71 3,751 addresses these problems by reducing the weight of the outer blade segment through the use of a modified structural spar and trailing edge pockets. More specifically, the structural spar of the outer blade segment includes a metallic C-shaped leading edge portion and a composite trailing edge pocket which is bonded thereto for closing the spar aft of the quarter chord. The modified spar and structural pockets eliminate certain requirements for leading edge counterweights thereby reducing the overall weight of the outer blade segment. While the teachings of Fradenburgh reduce the weight of the outer blade segment, the structural bonds formed between the C-shaped leading edge portion and the trailing edge pockets are potential sources of fatigue failure. Furthermore, the structural requirements for reacting the large compressive buckling loads are highest at the tip end of the outer blade segment. Accordingly, the configuration disclosed in Fradenburgh produces high tip end weight to accommodate the compressive buckling loads. As discussed supra, the concentration of weight at the tip end produces weight penalties in the torque tube, i.e., due to the edgewise stiffness requirements, and in the retraction/extension mechanism due to the imposition of large centrifugal loads.

The prior art references, including the Fradenburgh '751 patent, disclose constant wall thickness torque tube members which produce uniform weight distribution from the root end to the tip end thereof. Insofar as the imposed flapwise and edgewise bending loads increase from the root to the tip end of the torque tube member, it will be apparent that a constant wall thickness torque tube member which is optimally sized in the root end region for reacting such loads is non-optimally sized for the reduced loads experienced at the intermediate and tip end regions. Accordingly, a weight penalty is incurred in the regions outboard of the root end.

SUMMARY OF THE INVENTION

It is an object of the present invention to provide a torque tube/spar assembly for a VDR blade assembly which achieves a favorable stiffness, and, consequently, weight distribution along the longitudinal axis thereof.

It is another object of the present invention to provide a torque tube/spar assembly for a VDR blade assembly which is optimally fabricated to meet buckling strength design constraints at minimal unit weight.

It is a further object of the present invention to provide a torque tube/spar assembly for a VDR blade assembly which is optimally fabricated to meet bending moment design constraints at minimal unit weight.

It is yet a further object of the present invention to provide a torque tube/spar assembly for a VDR blade assembly wherein loads are more favorably distributed at the tip end thereof to reduce blade assembly weight.

A torque tube/spar assembly is provided for transferring the operational loads of a Variable Diameter Rotor blade assembly to a rotor hub assembly. The torque tube/spar assembly includes a torque tube member, a spar member and a bearing assembly for telescopically mounting the spar member to the torque tube member. The torque tube/spar assembly furthermore defines an internal channel for housing a retraction/extension mechanism which mounts to an internally formed restraint surface of the spar member and is operative to vary the length of the rotor blade assembly.

The torque tube member has a substantially constant external geometry along the length of bearing assembly engagement and defines a root end region, a tip end region and an intermediate transition region. The spar member has a substantially constant internal geometry and defines a root end region, a first transition region, an intermediate region, a second transition region, a restraint region and a tip end region. Each of the various regions of the torque tube and spar members have a characteristic stiffness value wherein the characteristic value of the intermediate transition and tip end regions of the torque tube member are less than the characteristic stiffness value of the root end region thereof, and wherein the characteristic stiffness value of the restraint region of the spar member is greater than the characteristic stiffness values of the intermediate and tip end regions thereof, and wherein the characteristic stiffness value of the intermediate region is less than the characteristic stiffness values of the root end, first transition, second transition and restraint regions.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 2 depicts a cross-sectional plan view of a Variable Diameter Rotor (VDR) blade assembly including a torque tube/spar assembly, and a retraction/extension mechanism for effecting telescopic translation thereof;

FIG. 4a shows an enlarged cross sectional view of the mounting arrangement for securing the VDR blade assembly to a rotor hub assembly;

FIG. 4b is a cross-sectional view taken substantially along line 4b—4b of FIG. 2;

BEST MODE FOR CARRYING OUT THE INVENTION

Figure 1A:
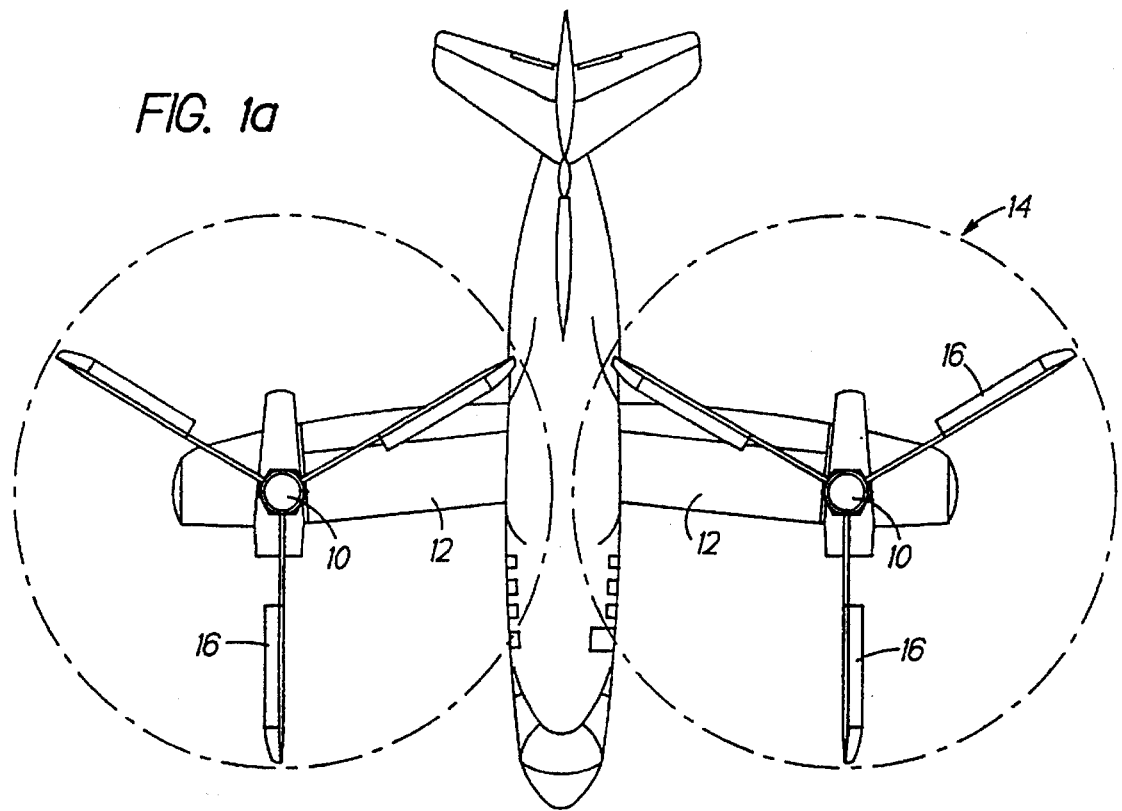
FIGS. 1a and 1b depict a Variable Diameter Rotor aircraft in hovering and forward flight modes of operation, respectively.
Figure 1B:
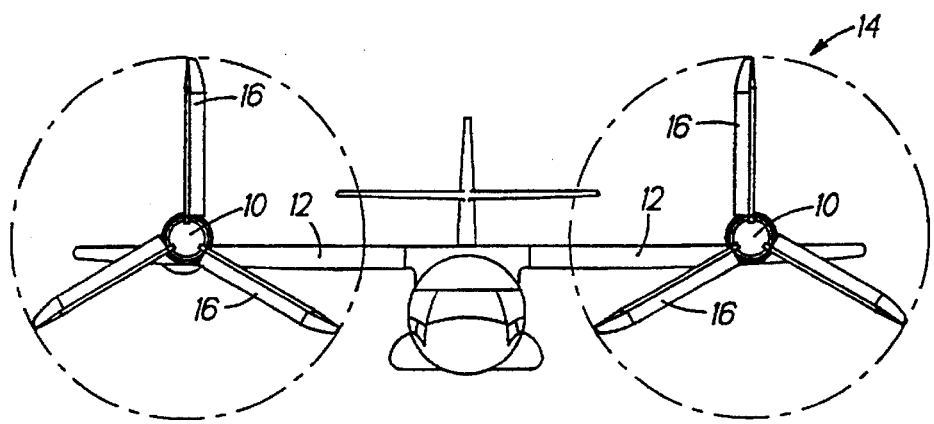

Referring now to the drawings wherein like reference characters identify corresponding or similar elements throughout the several views, FIGS. 1a and 1b show a tilt rotor aircraft having a pair of Variable Diameter Rotor (VDR) systems 10 mounted to laterally extending wing sections 12. The VDR systems 10 are pivotable so that the rotors 14 thereof may assume a horizontal or vertical orientation. Each VDR system 10 includes a plurality of Variable Diameter Rotor (VDR) blade assemblies 16 which are capable of extending or retracting thereby increasing or decreasing the rotor diameter. In FIG. 1a, the VDR blade assemblies 16 are in a fully-extended position for hovering flight, i.e., in a horizontal orientation relative to a ground plane, and, in FIG. 1b, the blade assemblies 16 are fully-retracted for operating in forward flight i.e., in a vertical orientation.

Figure 3A:
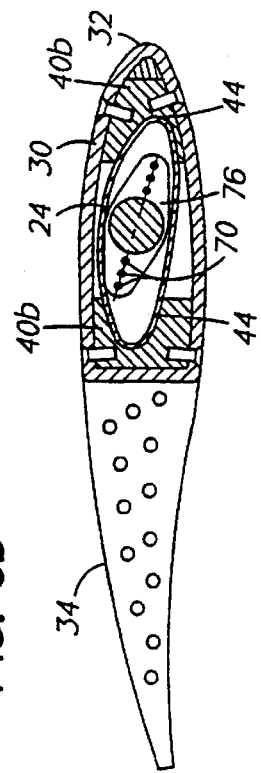
FIGS. 3a and 3b are cross-sectional views taken substantially along lines 3a—3a and 3b—3b, respectively, of FIG. 2.
Figure 3B:
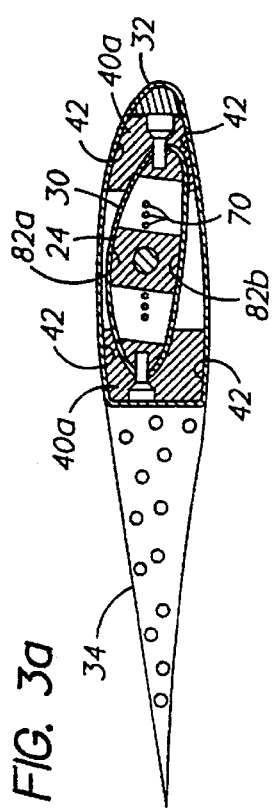

In FIG. 2, a VDR blade assembly 16 is shown in a fully-retracted position. The VDR blade assembly 16 is mounted to and driven by a rotor hub assembly 18 about an axis of rotation 20. The VDR blade assembly 16 includes a movable outer blade segment 22 which telescopes over a torque tube member 24 along a longitudinal axis 26 which projects outwardly of the rotational axis 20. More specifically, the outer blade segment 22 includes a spar member 30 (see FIGS. 3a and 3b) which is enveloped by a leading edge sheath 32 and a foam-filled trailing edge pocket assembly 34 to define the requisite aerodynamic contour of the outer blade segment 22. The spar member 30 is coaxially aligned with and accepts the torque tube member 24 so as to permit telescopic translation thereof relative to the torque tube member 24, and, consequently, permit retraction and extension of the VDR blade assembly 16.

Coaxial alignment of the torque tube and spar members 24, 30 may be effected by any conventional bearing assembly such as a rolling element bearing assembly. The preferred bearing assembly includes a first bearing block 40a mounted externally to the outboard end of the torque tube member 24 and a second bearing block 40b mounted to the inboard end of the spar member 30, and preferably internally thereto. The first bearing block 40a slideably engages an internal pilot surface 42 (FIG. 3a) formed within the spar member 30 and the second bearing block 40b slideably engages an external pilot surface 44 (FIG. 3b) formed about the exterior of the torque tube member 24. The external pilot surface 44 may include wear resistant strips (not shown) along the leading and trailing edges of the torque tube member, however, it should be understood that the external pilot surface 44 may be defined solely by the external surface of the torque tube members 24.

Any bearing block having a low friction bearing surface may be employed for aligning the torque tube and spar members 24, 30, however, the preferred bearing block is comprised of a Nylon Molybdenum Disulfide material such as produced by The Polymer Corporation, located in Reading, Pa. under the trademark NYLATRON®. To prevent binding or eccentric alignment of the torque tube and spar members 24, 30, it will be appreciated that the pilot surfaces 42, 44 formed on or within the torque tube and spar members 24, 30 must have a substantially constant cross-sectional shape and peripheral dimension, or substantially constant peripheral geometry, along the length of engagement. In the context used, the term "substantially constant" means within normal machining or molding tolerances, i.e., within about 0.076 cm (0.030 in).

The inboard end of the torque tube member 24 is adapted for mounting to a cuff assembly 50 (see FIG. 4) which is journally mounted to a radial arm 52 of the rotor hub assembly 18. The cuff assembly 50 engages a flared inboard end portion 54 of the torque tube member 24 by means of a correspondingly shaped internal restraint member 56 and an external restraint sleeve 58. The cuff assembly 50, furthermore, includes a pitch control arm 60 through which pitch control inputs are made about the longitudinal axis 26 of the VDR blade assembly.

Figure 5:
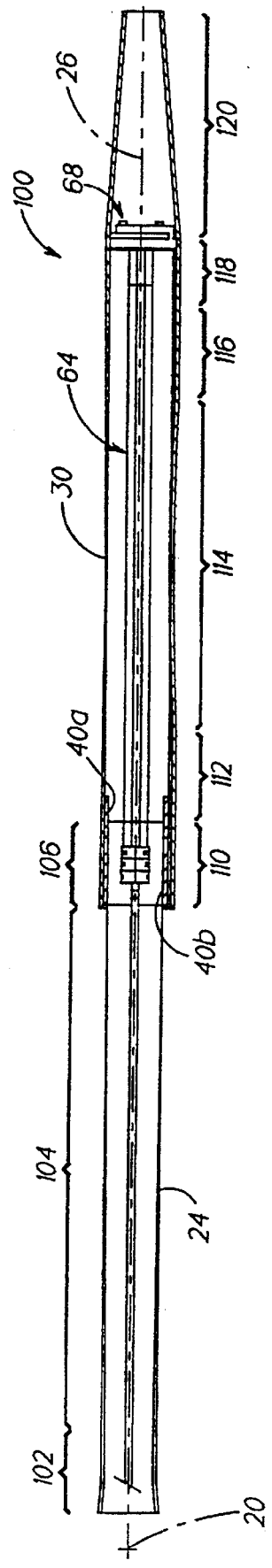
FIG. 5 depicts a partially exploded cross sectional view of the torque/tube spar assembly including a torque tube member and a spar member and wherein various regions of the torque tube and spar members are defined.

Referring to FIG. 2 and FIGS. 4a, 4b, the torque tube and spar members 24, 30 define an internal channel 62 for housing a retraction/extension mechanism 64. The retraction/extension mechanism 64 includes a jackscrew assembly 66, a restraint assembly 68, and a plurality of centrifugal straps 70 which mechanically couple the jackscrew and restraint assemblies 66, 68. The jackscrew assembly 66 is similar to that described in U.S. Pat. No. 3,768,923 and includes a centrally disposed jackscrew 72 having a plurality of threads for engaging a series of stacked nuts 76. The jackscrew 72 is supported at one end by a first journal bearing 78 (FIG. 4a) disposed internally of the radial arm 52 and, at the opposing end, to a second journal bearing 80 (FIG. 4b) supported between the upper and lower internal surfaces 82a, 82b of the torque tube member. The jackscrew 72 is, furthermore, driven in either direction by a bevel gear arrangement (not shown) disposed internally of the rotor hub assembly 18. For ease of illustration, the internal gearing mechanisms for driving the threaded jackscrew 72, will not be discussed. Suffice it to say that such mechanisms are known in the art and are described in U.S. Pat. Nos. 4,142,697, 4,007,997, 3,884,594 and 3,713,751. The stacked nuts 76 are rotationally restrained by the internal geometry of the torque tube member 24 (see FIG. 3b) yet are permitted to translate axially along the jackscrew 72 upon rotation thereof. Pairs of centrifugal straps 70 mechanically couple each stacked nut 76 of the jackscrew assembly 66 to the restraint assembly 68 which engages an internally formed restraint surface 86 (FIG. 4b) of the spar member 30. As the jackscrew 72 turns, the stacked nuts 76 are caused to translate inwardly or outwardly, thereby effecting axial translation of the outer blade segment 22. Referring to FIG. 5, the torque tube member 24, the spar member 30 and the bearing assembly 40a, 40b, in combination, form a torque tube/spar assembly 100 which functions to transfer the operational loads of the VDR blade assembly to the rotor hub assembly. For a better understanding of the imposed loads, and the portions of the torque tube/spar assembly 100 which accommodate such loads, the torque tube and spar members 24, 30 are subdivided into various regions as follows. The torque tube member 24 includes a root end region 102, a tip end region 106 and an intermediate transition region 104 therebetween. The spar member 30 includes a root end region 110, a first transition region 112, an intermediate region 114, a second transition region 116, a restraint region 118 and a tip end region 120. The various regions of the torque tube and spar members 24, 30 are disposed at increasing radial station. Radial station is defined as the ratio, r/R, wherein r is the radial dimension at a point along the longitudinal axis 26 measured from the rotational axis 20, and R is the fully-extended radial dimension of the torque tube/spar assembly 100.

The torque tube member 24 carries combined flapwise and edgewise bending loads to/from the rotor hub assembly 18 and transfers pitch control loads, i.e., torsional loads, to the outer blade segment 22. Flapwise and edgewise bending loads are highest in the root end region 102 and gradually diminish in the intermediate and tip end regions 104, 106. Torsional loads are substantially constant in each region of the torque tube member 24. Centrifugal forces developed in the torque tube member 24 are relatively low, i.e., are a function of the mass of the torque tube member 24 only, insofar as centrifugal forces acting on the outer blade segment 22 bypass the torque tube member 24 and are transferred to the rotor hub assembly 18 via retraction/extension mechanism 64. Moreover, centrifugal loads are carried as a tensile load in the various regions of the torque tube member 24.

The spar member 30 transfers flapwise and edgewise bending loads of the outer blade segment 22 to the torque tube member 24, and reacts the torsional loads of the outer blade segment 22. Similar to the torque tube member 24, flapwise and edgewise bending loads are highest in the root end region 110 of the spar member 30 and gradually diminish in regions outboard thereof. Centrifugal loads in the spar member 30 are carried in compression in the restraint region 118, and regions radially inboard thereof, and as a tensile load in the tip end region 120. Furthermore, the compressive centrifugal loads, i.e., compressive buckling loads, are highest in the restraint region 118 and gradually diminish in regions radially inboard thereof.

Figure 6:
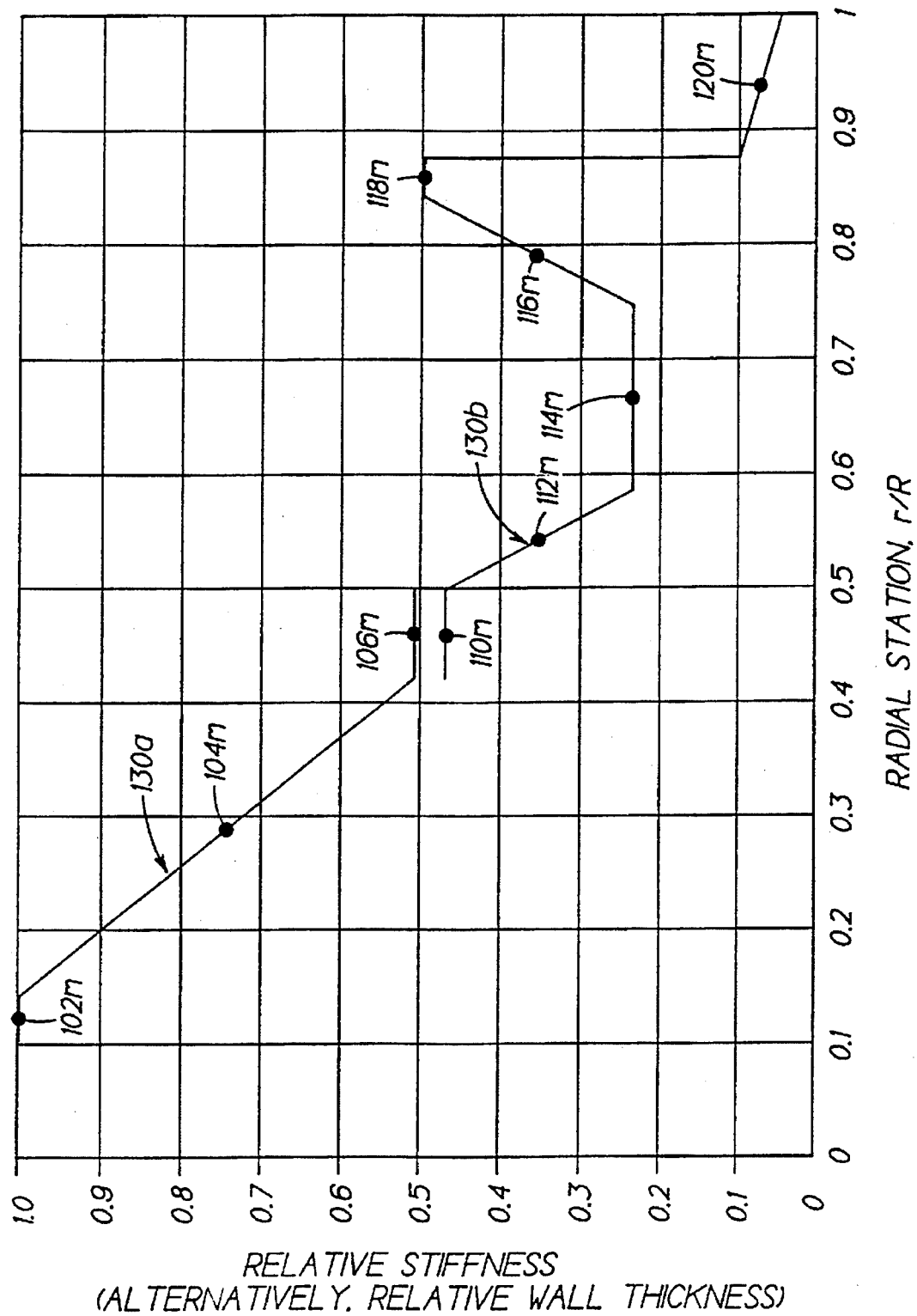
FIG. 6 is a graphical representation of a relative stiffness profile, and alternatively, a wall thickness distribution for the optimized torque tube/spar assembly of the present invention.

The torque tube/spar assembly 100 is optimally fabricated to achieve a favorable mass/weight distribution along the longitudinal axis 26 thereof while meeting the compressive buckling and bending moment design criteria. For a better understanding of the structural and functional characteristics which address the foregoing objectives, a relative stiffness profile of the preferred torque tube/spar assembly 100 is graphically depicted in FIG. 6 A first portion 130a of the relative stiffness profile corresponds to the torque tube member while a second portion 130b corresponds to the spar member. Insofar as the torque tube and spar members are essentially symmetric about flapwise and edgewise elastic axes, the relative stiffness profile 130a, 130b accurately characterizes the relative flapwise (out-of-plane) and edgewise (in-plane) stiffness properties thereof. Furthermore, the stiffness profile 130a, 130b is given for a fully-extended blade assembly 16 inasmuch as the loads and motions of the torque tube/spar assembly 100 are greatest in a fully-extended position. It should be understood that the relative stiffness profile 130a, 130b is analogous to wall thickness distribution and/or a weight distribution for an assembly fabricated from a material having isotropic structural properties, e.g., aluminum or titanium. Further weight savings are achievable through the use of directional stiffness materials, such as composite materials wherein the fibrous reinforcement thereof is optimally oriented to achieve the desired stiffness at minimal unit weight.

The relative stiffness of each region is plotted as a function of the instantaneous radial station for a fully-extended torque tube/spar assembly. The terminal inboard end of the torque tube begins at radial station 0.1 insofar as the VDR blade assembly is offset from the rotational axis 20 by an amount equal to the radius of the rotor hub assembly. While the relative stiffness profile 130a, 130b specifically identifies regions as beginning or ending at a particular radial station, it should be understood that the regions, and corresponding profile segments within the stiffness profile 130a, 130b, may span longer or shorter radial lengths without departing from the spirit and scope of the invention. Furthermore, while the profile segments are shown to vary linearly with respect to radial station, it should be understood that each segment may be curvilinear to effect a smooth transition from segment to segment.

The stiffness values are plotted relative to the highest stiffness value at radial station 0.1 which is arbitrarily assigned a numerical value of 1.0. Accordingly, the relative stiffness values are unitless and are obtained by dividing the actual stiffness (EI, lbs-in$^2$) of the torque tube or spar members, at a particular radial station by the actual stiffness (EI, lbs-in$^2$) of the torque tube member at radial station 0. For the purposes of comparing the relative stiffnesses within each region, a characteristic stiffness value of each region is defined (denoted by the subscript "m") which is equivalent to the median stiffness value within the specific region.

Referring to the first portion 130a of the stiffness profile, the relative stiffness of root end region, which extends from radial station 0.1 to 0.15, defines a first maximum stiffness value at radial station 0.1. The relative stiffness declines in the intermediate transition region, from radial station 0.15 to 0.42 and reaches a minimum stiffness value in the tip end region, corresponding to radial stations 0.42 through 0.5. Preferably, the relative stiffness of the intermediate transition region decreases linearly with increasing radial station. It will be apparent, therefore, that the characteristic stiffness values 104m and 106m of the intermediate transition and tip end regions, respectively, are less than the comparable characteristic stiffness value 102m of the root end region. Preferably, the characteristic stiffness value 106m of the tip end region declines to about 50% of the characteristic stiffness value 102m of the root end region.

In the second portion 130b of the stiffness profile, the relative stiffness declines to a first minimum value in the intermediate transition region of the spar member, between radial stations 0.58 and 0.75 and reflexes upwardly to a second maximum stiffness value in the restraint region, corresponding to radial stations 0.84 through 0.88. The relative stiffness then declines precipitously (shown as a step function) in the tip end region which extends from radial station 0.88 to 1.0. It will be apparent, therefore, that the characteristic stiffness value 114m of the intermediate region is less than the respective characteristic stiffness values 110m, 112m, 116m, and 118m of the root end, first transition, second transition and restraint regions. Furthermore, the characteristic stiffness value 118m of the restraint region is greater than the characteristic stiffness values 114m and 120m of the intermediate and tip end regions. Preferably, the characteristic stiffness value 114m of the intermediate region is less than about 30% of the characteristic stiffness value 102m of the root end region of the torque tube member while the characteristic stiffness value 120m of the tip end region is preferably less than about 15% thereof.

While the stiffness profile 130a, 130b described in preceding paragraphs may be achieved by various methods such as by altering the material composition from region to region, the preferred embodiment alters the relative wall thickness of the torque tube and spar members to effect the desired stiffness variations. For a material having isotropic strength properties, variations in wall thickness follow the same relationship, i.e., relative profile, as described and depicted in FIG. 6. For simplicity of discussion and illustration, therefore, it will suffice to say that the ordinate axis of FIG. 6 may be alternatively labeled "relative wall thickness" and that parallel relationships exist between relative wall thickness and relative stiffness values, and between characteristic wall thickness and characteristic stiffness value.

Irrespective of the method used to achieve the desired stiffness distribution, the torque tube and spar members are fabricated so as to maintain substantially constant external and internal geometries, respectively. As discussed earlier, this requirement is imposed by the telescoping feature of the VDR blade assembly. In the preferred embodiment, stiffness variations in the various regions of the torque tube member are produced by varying the characteristic wall thickness internally so as not to alter the contour of the external peripheral geometry. Similarly, thickness variations in the spar member are made by varying the characteristic wall thickness externally without influencing the contour of the internal peripheral geometry.

By reducing the stiffness/wall thickness requirements in various regions of the torque tube/spar assembly, a favorable weight distribution is achieved. Referring to FIG. 5, the weight of the torque tube member 24 is decreased by reducing the stiffness/wall thickness in the intermediate transition and tip end regions 104, 106 in accordance with the reduced flapwise and edgewise bending loads imposed therein. The weight of the spar member 30 is minimized by reducing the stiffness/wall thickness in the first transition, intermediate and second transition regions 112, 114, 116 wherein bending moment and compressive buckling loads are minimal. By reducing weight in the outboard regions of the torque tube member 24 and within the spar member 30, stiffness/weight requirements of the torque tube member 30 are minimized. Furthermore, the size and weight of the retraction/extension mechanism may be commensurately reduced by minimizing the weight of the spar member 30.

Figure 7:
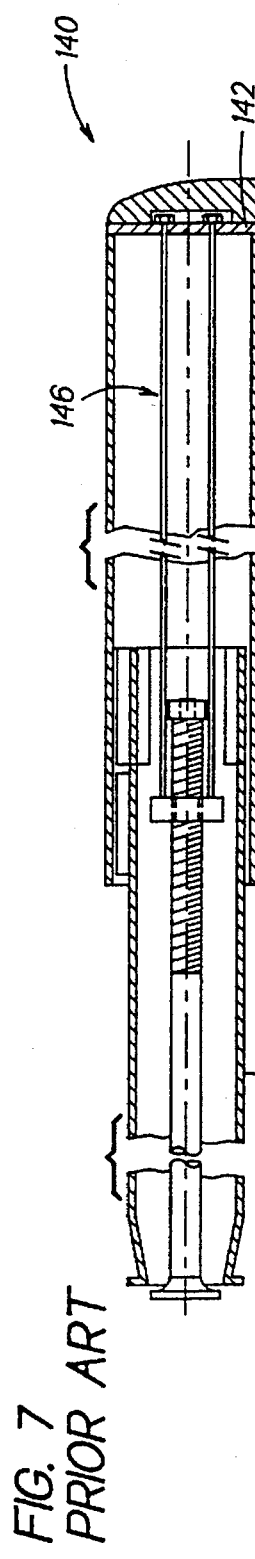
FIG. 7 shows a sectioned plan view of a prior art variable diameter rotor blade assembly.

To further reduce weight, the mounting arrangement for coupling the retraction/extension mechanism 64 to the spar member 30 is disposed radially inboard of the tip end region 120. As such, the mounting arrangement effects a more efficient loading/weight distribution and facilitates the formation of an aerodynamic blade tip. To best understand the advantages of this construction, a comparison is made to a prior art variable diameter rotor blade assembly 140, (see FIG. 7), wherein a retention plate 142 is mounted to an outermost end portion of the internal spar member 144 for transferring centrifugal loads to an internal retraction/extension mechanism 146. The prior art blade assembly 140 includes a removable tip cap 148 to facilitate mounting of the retention plate 142 to the internal spar member 144. While this construction provides ready access to the outermost end portion of the spar member 144, the resultant stiffness/weight requirements necessary to react the compressive buckling loads are maximum at this radial location. This is more readily appreciated by recognizing that the sum of the centrifugal forces of the spar member 144 and outer blade segment 150 culminate at the tip end 152 of the blade assembly. As discussed in the "Background of the Invention", the resultant weight distribution adversely impacts stiffness and weight requirements of the torque tube member 24 and retraction/extension mechanism.

In FIGS. 4b and 5, the restraint assembly 66 engages the restraint surface 68 to mechanically couple the retraction/extension mechanism 64 to the spar member 30. Insofar as the restraint surface 68 is disposed at the terminal end of the restraint region 118 and inboard of the tip end region 120, the resultant mounting arrangement places the restraint region 118, and regions inboard thereof, in compression, and the tip end region 120 in tension. As such, the mounting arrangement effects a more efficient loading distribution by reducing the compressive buckling loads, i.e., a function of radial station, and utilizing the tensile strength of the spar member 30 to react centrifugal loads outboard of the restraint surface 68. This loading distribution effects a more favorable weight distribution by reducing peak compressive loads in the spar member 30 and reducing the structural requirements in the tip end region 120 thereof. That is, the loading distribution has the effect of shifting the center of mass/weight of the outer blade segment 22 inwardly. Accordingly, the resultant weight distribution reduces the stiffness/weight requirements of the torque tube member 30 and the retraction/extension mechanism 64.

The mounting arrangement also facilitates the formation of an aerodynamic blade tip, i.e., the portion of the outer blade segment corresponding to the tip end region 120 of the spar member 30. Referring to FIGS. 2 and 5, the tip end 154 of the outer blade segment 22 is shown to include both chordwise taper and a rearwardly swept leading edge to minimize induced and profile drag losses. It will be appreciated that the stiffness in the tip end region 120 is commensurately reduced by the geometric constraints of the aerodynamic blade tip 154 and, consequently, is less efficient in reacting compressive buckling loads. By relocating the restraint assembly 66 inboard of the tip end region 120, the blade tip 154 may assume an aerodynamic shape, i.e., incorporating taper, twist, anhedral and sweep, without impeding the structural efficiency of the spar member 30. Examples of aerodynamic blade tips are shown and described in Jepson U.S. Pat. No. 3,822,105 and Fradenburgh U.S. Pat. No. 4,324,530.

Thus far, the description of the torque tube/spar assembly 100 has been directed to optimizing the stiffness distribution for reducing weight as a function of radial station. That is, minimizing the weight of outermost regions of the torque tube and spar members 24, 30. The following discussion addresses the composition of the torque tube and spar members 24, 30 to minimize the weight characteristics of each region.

Figure 8A:
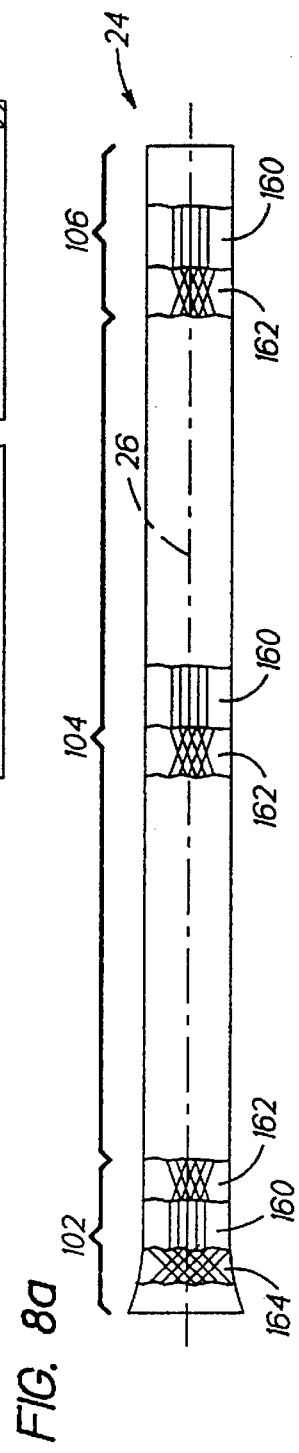
FIGS. 8a and 8b depict an alternate construction for forming the torque tube and spar members wherein composite laminates having select fiber orientation are employed in the various regions to further optimize the torque tube/ spar assembly.
Figure 8B:
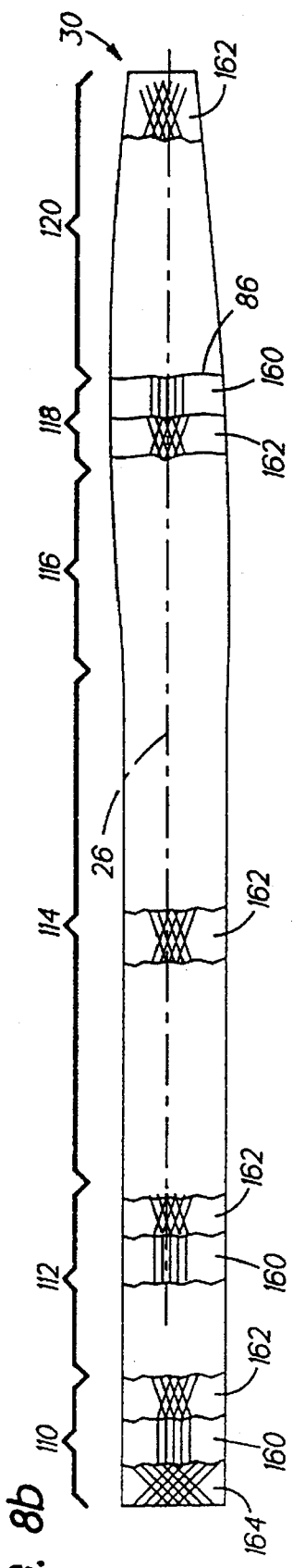

While the torque tube/spar assembly 100 may be comprised of various materials having the requisite strength to produce the desired stiffness profile, the preferred torque tube/spar assembly 100 is comprised of composite material having directional stiffness properties, i.e., directionally oriented structural fibers, to optimally react the imposed loads. More specifically, the preferred torque tube and spar members 24, 30 are formed from composite laminates having reinforcing fibers such as graphite, aramide or fiberglass fibers disposed in a binding matrix such as epoxy, phenolic or other similar organic resinous material. The composite laminates are laid, i.e., stacked and arranged, in various regions of the torque tube and spar members 24, 30 to achieve the desired stiffness distribution. Referring to FIGS. 8a and 8b, the composite laminates include unidirectional, first crossply and second crossply laminates 160, 162, 164 each having a selected fiber orientation to optimize the overall weight of the torque tube/spar assembly 100. The precise composite lay-up thickness, e.g., number of laminates, will not be discussed insofar as the wall thickness is dependent upon the specific loading conditions, the selected fiber reinforcement and the resin system employed.

FIGS. 8a and 8b depict the distribution of the composite laminates 160, 162, 164 in the various regions of the torque tube and spar members 24, 30. Before discussing the structural and functional characteristics of the composite laminates, each laminate-type will be described in terms of the fiber orientations relative to the longitudinal axis 26 of the torque tube/spar assembly 100. The unidirectional laminates 160 include reinforcing fibers which are substantially parallel to the longitudinal axis 26, i.e., within about ±5 degrees and, preferably, about 0 degrees relative to the axis. The first crossply laminates 162 include reinforcing fibers which are preferably oriented at between about ±15 to about ±35 degrees relative to the longitudinal axis 26, and, more preferably, between about ±15 to about ±25 degrees relative thereto. The second crossply laminates 164 are oriented between about ±40 to about ±50 degrees relative to the longitudinal axis 26, and, more preferably at about ±45 degrees relative thereto.

The unidirectional and first crossply laminates 160, 162 are disposed in all regions of the torque tube member 24 and provide high axial stiffness to react flapwise and edgewise bending and centrifugal loads. The first crossply laminates 162 are axially biased, in the direction of the longitudinal axis 26, to augment the axial stiffness of the torque tube member 24. Concomitantly, the first crossply laminates 162 are sufficiently "off-axis" to provide the necessary torsional stiffness. Second crossply laminates 164 are disposed in the root end region 102 of the torque tube member 24 to optimally transfer flapwise and edgewise shear loads to the rotor hub assembly 18.

Unidirectional laminates 160 are disposed in the root end, first transition, second transition and restraint regions, 110, 112, 116, 118 of the spar member 30 to react flapwise and edgewise bending and compressive buckling loads therein. The first crossply laminates 162 are disposed in all regions of the spar member 30, i.e., including the intermediate and tip end regions 114, 120, and function to augment the axial stiffness provided by the unidirectional laminates while, additionally, providing the necessary torsional stiffness. The first crossply laminates 162 are sufficiently axially biased to react the bending and compressive buckling loads in the intermediate region, and to accommodate the centrifugally induced tensile loads in the tip end region 120. Second crossply laminates 164 are disposed in the root end region of the spar member 30 to optimally transfer flapwise and edgewise shear loads to the torque tube member 24.

The following table provides a synopsis of the major fiber orientations of the torque tube and spar members 24, 30 according to the preferred embodiment of the present invention:

TABLE

| Region | Fiber Orientation |
| --- | --- |
| Torque Tube Member | |
| Root End | ±40 → ±50/±15 → ±35/0 |
| First Transition | ±15 → ±35/0 |
| Tip End | ±15 → ±35/0 |
| Spar Member | |
| Root End | ±40 → ±50/±15 → ±35/0 |
| First Transition | ±15 → ±35/0 |
| Intermediate | ±15 → ±35 |
| Second Transition | ±15 → ±35/0 |
| Restraint | ±15 → ±35/0 |
| Tip End | ±15 → ±35 |

It should be understood that the unidirectional and first crossply laminates 160, 162 vary in length, i.e., progressively terminate or "drop-off", so as to produce the requisite stiffness reduction in the various transition regions of the torque tube and spar members 24, 30. Furthermore, a selected number of unidirectional and first crossply laminates 160, 162 abruptly terminate at the terminal end of the restraint region so as to produce the restraint surface 86.

While the torque tube member 24 may be formed using a variety of fabrication techniques, the preferred method employs the use of an inflatable mandrel assembly (not shown) wherein the composite laminates 160, 162, 164 of the torque tube member 24 are sequentially laid thereover to produce an uncured composite lay-up. The lay-up is then placed in a matched metal molding assembly having a mold surface which defines the external peripheral geometry of the torque tube member. The inflatable mandrel assembly is then pressurized to urge the composite laminates against the mold surface, thereby forming a substantially smooth external peripheral geometry. The molding assembly is then placed in an autoclave for curing the composite laminates 160, 162, 164 under heat and pressure.

The preferred method for forming the spar member 30 employs the use of a solid mandrel assembly (not shown) having a mold surface which defines the internal peripheral geometry, including the restraint surface, of the spar member. The composite laminates 160, 162, 164 of the spar member 30 are sequentially laid over the solid mandrel to produce an uncured composite lay-up. The composite lay-up is then vacuum bagged using conventional vacuum forming techniques to consolidate the composite laminates against the mold surface thereby producing a substantially smooth internal peripheral geometry. The entire assembly is then placed in an autoclave oven for curing the composite lay-up.

Although the invention has been shown and described with respect to exemplary embodiments thereof, it should be understood by those skilled in the art that the foregoing and other changes, omissions and additions may be made therein and thereto, without departing from the spirit and scope of the present invention.

What is claimed is:

1. A torque tube and spar assembly (100) for a Variable Diameter Rotor blade assembly (16), said torque tube and spar assembly (100) operative to transfer the operational loads thereof to a rotor hub assembly (18), said torque tube and spar assembly (100) furthermore having a longitudinal axis (26) and an internal channel (62) for accepting a retraction and extension mechanism (64), said retraction and extension mechanism (64) operative to vary the length of the rotor blade assembly (16), said torque tube and spar assembly (100), comprising:

a torque tube member (24) having a root end region (102), a tip end region (106) and an intermediate transition region (104) disposed therebetween, each of said regions having a characteristic stiffness value, said characteristic stiffness values (104m, 106m) of said intermediate transition and tip end regions (104, 106) being less than said characteristic stiffness value (102m) of said root end region (102);

said torque tube member (24) having a substantially constant external peripheral geometry along said longitudinal axis (26);

a spar member (30) having a substantially constant internal peripheral geometry along said longitudinal axis (26) and, furthermore, having a restraint surface (86) for engaging said retraction and extension mechanism (64); and, a bearing assembly (40a, 40b) for telescopically mounting said spar member (30) to said torque tube member (24).

2. The torque tube and spar assembly (100) according to claim 1 wherein said torque tube member (24) includes unidirectional and first crossply laminates (160, 162) having reinforcing fibers disposed in a binding matrix, said reinforcing fibers of said unidirectional laminates (160) being oriented substantially parallel to the longitudinal axis (26), and said reinforcing fibers of said first crossply laminates (162) being oriented between about ±15 to about ±35 degrees relative to said longitudinal axis (26).

3. The torque tube and spar assembly (100) according to claim 2 wherein said reinforcing fibers of said first crossply laminates (162) are oriented between about ±15 to about ±25 degrees relative to said longitudinal axis (26).

4. The torque tube and spar assembly (100) according to claim 2 wherein said torque tube member (24) includes second crossply laminates (164) disposed in said root end region (102) thereof, said second crossply laminates (164) having reinforcing fibers disposed in a binding matrix, said reinforcing fibers of said second crossply laminates (164) being oriented between about ±40 to about ±50 degrees relative to said longitudinal axis (26).

5. A torque tube and spar assembly (100) for a Variable Diameter Rotor blade assembly (16), said torque tube and spar assembly (100) operative to transfer the operational loads thereof to a rotor hub assembly (18), said torque tube and spar assembly (100) furthermore having a longitudinal axis (26) and an internal channel (62) for accepting a retraction and extension mechanism (64), said retraction and extension mechanism (64) operative to vary the length of the rotor blade assembly (16), said torque tube and spar assembly (100), furthermore, comprising:

a torque tube member (24) having a substantially constant external peripheral geometry along said longitudinal axis (26);

a spar member (30) having a root end region (110), a first transition region (112), an intermediate region (114), a second transition region (116), a restraint region (118) and a tip end region (120), each of said regions having a characteristic stiffness value, said characteristic stiffness value of said restraint region (118) being greater than said characteristic stiffness values (114m, 120m) of said intermediate and said tip end regions (114, 120,) and said characteristic stiffness value (114m) of said intermediate region (114) being less than said characteristic stiffness values (110m, 112m, 116m, 118m) of said root end, first transition, second transition and restraint regions (110, 112, 116, 118);

said spar member (30) having a substantially constant internal peripheral geometry along said longitudinal axis (26) and, furthermore, having a restraint surface (86) for engaging said retraction and extension mechanism (64); and, a bearing assembly (40a, 40b) for telescopically mounting said spar member (30) to said torque tube member (24).

6. The torque tube and spar assembly (100) according to claim 5 wherein said restraint surface (86) is disposed at the terminal end of the of the restraint region (118).

7. The torque tube and spar assembly (100) according to claim 5 wherein said torque tube member (24) defines an external pilot surface (44), and said spar member (30) defines an internal pilot surface (42), and wherein said bearing assembly (40a, 40b) includes a first bearing block (40a) mounting to an outboard end of said torque tube member (24), a second bearing block (40b) mounting to an inboard end of said spar member (30), said first bearing block (40a) slideably engaging said internal pilot surface (42) of said spar member (30), and said second bearing block (40b) slideably engaging said external pilot surface (44) of said torque tube member (24).

8. The torque tube and spar assembly (100) according to claim 5 wherein said torque tube member (24) includes unidirectional and first crossply laminates (160, 162) having reinforcing fibers disposed in a binding matrix, said reinforcing fibers of said unidirectional laminates (160) being oriented substantially parallel to the longitudinal axis (26), and said reinforcing fibers of said first crossply laminates (162) being oriented between about ±15 to about ±35 degrees relative to said longitudinal axis (26).

9. The torque tube and spar assembly (100) according to claim 8 wherein said reinforcing fibers of said first crossply laminates (162) are oriented between about ±15 to about ±25 degrees relative to said longitudinal axis (26).

10. The torque tube and spar assembly (100) according to claim 8 wherein said torque tube member (24) includes second crossply laminates (164) disposed in said root end region (102) thereof, said second crossply laminates (164) having reinforcing fibers disposed in a binding matrix, said reinforcing fibers of said second crossply laminates (164) being oriented between about ±40 to about ±50 degrees relative to said longitudinal axis (26).

11. The torque tube and spar assembly (100) according to claim 5 wherein said spar member (30) includes first crossply laminates (162) having reinforcing fibers disposed in a binding matrix, said reinforcing fibers of said first crossply laminates (162) being oriented between about 15 to about ±35 degrees relative to said longitudinal axis (26).

12. The torque tube and spar assembly (100) according to claim 11 wherein said reinforcing fibers of said first crossply laminates (162) are oriented between about ±15 to about ±25 degrees relative to said longitudinal axis (26).

13. The torque tube and spar assembly (100) according to claim 11 wherein said spar member (30) includes unidirectional laminates (160) disposed in said root end, first transition, second transition and restraint regions (110, 112, 116, 118) thereof, said unidirectional laminates (160) having reinforcing fibers disposed in a binding matrix, said reinforcing fibers of said unidirectional laminates (160) being substantially parallel to said longitudinal axis (26).

14. The torque tube and spar assembly (100) according to claim 13 wherein said spar member (30) includes second crossply laminates (164) disposed in said root end region (110) thereof, said second crossply laminates (164) having reinforcing fibers disposed in a binding matrix, said reinforcing fibers of said second crossply laminates (164) being oriented between about ±40 to about ±50 degrees relative to said longitudinal axis (26).

15. A torque tube and spar assembly (100) for a Variable Diameter Rotor blade assembly (16), said torque tube and spar assembly (100) operative to transfer the operational loads thereof to a rotor hub assembly (18), said torque tube and spar assembly (100) furthermore having a longitudinal axis (26) and a internal channel (62) for accepting a retraction and extension mechanism (64), said retraction and extension mechanism (64) operative to vary the length of the rotor blade assembly (16), said torque tube and spar assembly (100), furthermore, comprising:

a torque tube member (24) having a root end region (102), a tip end region (106) and an intermediate transition region (104) disposed therebetween, each of said regions having a characteristic stiffness value (102m), said characteristic stiffness values (104m, 106m) of said intermediate transition and tip end regions (104, 106) being less than said characteristic stiffness value (102m) of said root end region (102), said torque tube member (24) having a substantially constant external peripheral geometry along said longitudinal axis (26);

a spar member (30) having a root end region (110), a first transition region (112), an intermediate region (114), a second transition region (116), a restraint region (118) and a tip end region (120), each of said regions having a characteristic stiffness value, said characteristic stiffness value of said restraint region (118) being greater than said characteristic stiffness values (114m, 120m) of said intermediate and said tip end regions (114, 120,) and said characteristic stiffness value (114m) of said intermediate region (114) being less than said characteristic stiffness values (110m, 112m, 116m, 118m) of said root end, first transition, second transition and restraint regions (110, 112, 116, 118);

said spar member (30) having a substantially constant internal peripheral geometry along said longitudinal axis (26) and, furthermore, having a restraint surface (86) for engaging said retraction and extension mechanism (64); and, a bearing assembly (40a, 40b) for telescopically mounting said spar member (30) to said torque tube member (24).

16. The torque tube and spar assembly (100) according to claim 15 wherein said restraint surface (86) is disposed at the terminal end of the of the restraint region (118).

17. The torque tube and spar assembly (100) according to claim 15 wherein said torque tube member (24) defines an external pilot surface (44), and said spar member (30) defines an internal pilot surface (42), and wherein said bearing assembly (40a, 40b) includes a first bearing block (40a) mounting to an outboard end of said torque tube member (24), a second bearing block (40b) mounting to an inboard end of said spar member (30), said first bearing block (40a) slideably engaging said internal pilot surface (42) of said spar member (30), and said second bearing block (40b) slideably engaging said external pilot surface (44) of said torque tube member (24).

18. The torque tube and spar assembly (100) according to claim 15 wherein said torque tube member (24) includes unidirectional and first crossply laminates (160, 162) having reinforcing fibers disposed in a binding matrix, said reinforcing fibers of said unidirectional laminates (160) being oriented substantially parallel to the longitudinal axis (26), and said reinforcing fibers of said first crossply laminates (162) being oriented between about ±15 to about ±35 degrees relative to said longitudinal axis (26).

19. The torque tube and spar assembly (100) according to claim 18 wherein said reinforcing fibers of said first crossply laminates (162) are oriented between about ±15 to about ±25 degrees relative to said longitudinal axis (26).

20. The torque tube and spar assembly (100) according to claim 18 wherein said torque tube member (24) includes second crossply laminates (164) disposed in said root end region (102) thereof, said second crossply laminates (164) having reinforcing fibers disposed in a binding matrix, said reinforcing fibers of said second crossply laminates (164) being oriented between about ±40 to about ±50 degrees relative to said longitudinal axis (26).

21. The torque tube and spar assembly (100) according to claim 15 wherein said spar member (30) includes first crossply laminates (162) having reinforcing fibers disposed in a binding matrix, said reinforcing fibers of said first crossply laminates (162) being oriented between about ±15 to about ±35 degrees relative to said longitudinal axis (26).

22. The torque tube and spar assembly (100) according to claim 21 wherein said reinforcing fibers of said first crossply laminates (162) are oriented between about ±15 to about ±25 degrees relative to said longitudinal axis (26).

23. The torque tube and spar assembly (100) according to claim 21 wherein said spar member (30) includes unidirectional laminates (160) disposed in said root end, first transition, second transition and restraint regions (110, 112, 116, 118) thereof, said unidirectional laminates (160) having reinforcing fibers disposed in a binding matrix, said reinforcing fibers of said unidirectional laminates (160) being substantially parallel to said longitudinal axis (26).

24. The torque tube and spar assembly (100) according to claim 23 wherein said spar member (30) includes second crossply laminates (164) disposed in said root end region (110) thereof, said second crossply laminates (164) having reinforcing fibers disposed in a binding matrix, said reinforcing fibers of said second crossply laminates (164) being oriented between about ±40 to about ±50 degrees relative to said longitudinal axis (26).

25. A torque tube and spar assembly (100) for a Variable Diameter Rotor blade assembly (16), said torque tube and spar assembly (100) operative to transfer the operational loads thereof to a rotor hub assembly (18), said torque tube and spar assembly (100) furthermore having a longitudinal axis (26) along which radial stations are defined, and a internal channel (62) for accepting a retraction and extension mechanism (64), said retraction and extension mechanism (64) operative to vary the length of the rotor blade assembly (16), said torque tube and spar assembly (100), furthermore, comprising:

a torque tube member (24) having a root end region (102), a tip end region (106) and an intermediate transition region (104) disposed therebetween, each of said regions having a characteristic wall thickness, said characteristic wall thickness of said intermediate transition region (104) decreasing with increasing radial station, said wall thickness of said tip end region (106) being less than said characteristic wall thicknesses of said intermediate transition and root end regions (104, 106)

said torque tube member (24) including unidirectional and first crossply laminates (160, 162) having reinforcing fibers disposed in a binding matrix, said reinforcing fibers of said unidirectional laminates (160) being oriented substantially parallel to the longitudinal axis (26), and said reinforcing fibers of said first crossply laminates (162) being oriented between about ±15 to about ±35 degrees relative to said longitudinal axis (26);

said torque tube member (24), furthermore, having a substantially constant external peripheral geometry along said longitudinal axis (26);

a spar member (30) having a root end region (110), a first transition region (112), an intermediate region (114), a second transition region (116), a restraint region (118) and a tip end region (120), each of said regions having a characteristic wall thickness, said characteristic wall thickness of said restraint region (118) being greater than said characteristic wall thickness of said intermediate and said tip end regions (114, 120), and said characteristic wall thickness of said intermediate region (114) being less than said characteristic wall thicknesses of said root end, first transition, second transition and restraint regions (110, 112, 116, 118)

said spar member (30) including first crossply laminates (162) having reinforcing fibers disposed in a binding matrix, said reinforcing fibers of said first crossply laminates (162) being oriented between about ±15 to about ±35 degrees relative to said longitudinal axis (26);

said spar member (30), furthermore, including unidirectional laminates (160) disposed in said root end, first transition, second transition and restraint regions (110, 112, 116, 118) thereof, said unidirectional laminates (160) having reinforcing fibers disposed in a binding matrix, said reinforcing fibers of said unidirectional laminates (160) being substantially parallel to said longitudinal axis (26);

said spar member (30), furthermore, having a substantially constant internal peripheral geometry along said longitudinal axis (26) and, furthermore, having a restraint surface (86) for engaging said retraction and extension mechanism (64); and, a bearing assembly (40a, 40b) for telescopically mounting said spar member (30) to said torque tube member (24).

\* \* \* \* \*